United States Patent
Aron et al.

(10) Patent No.: US 8,627,135 B2
(45) Date of Patent: Jan. 7, 2014

(54) MANAGEMENT OF A DISTRIBUTED COMPUTING SYSTEM THROUGH REPLICATION OF WRITE AHEAD LOGS

(75) Inventors: Mohit Aron, Los Altos, CA (US); Diwaker Gupta, San Francisco, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 12/856,585

(22) Filed: Aug. 14, 2010

(65) Prior Publication Data
US 2012/0042196 A1    Feb. 16, 2012

(51) Int. Cl.
*G06F 11/00*    (2006.01)
(52) U.S. Cl.
USPC ............................................ 714/4.11; 714/4.1
(58) Field of Classification Search
None
See application file for complete search history.

(56) References Cited

U.S. PATENT DOCUMENTS

| 5,280,611 | A | | 1/1994 | Mohan et al. | |
|---|---|---|---|---|---|
| 5,566,297 | A | * | 10/1996 | Devarakonda et al. | 714/15 |
| 6,055,604 | A | * | 4/2000 | Voigt et al. | 711/117 |
| 7,168,001 | B2 | | 1/2007 | Johnson et al. | |
| 2007/0006015 | A1 | * | 1/2007 | Rao et al. | 714/4 |
| 2007/0220059 | A1 | | 9/2007 | Lu et al. | |

OTHER PUBLICATIONS

Microsoft Computer Dictionary, Fifth Edition, 2002, Microsoft Press, p. 475.*
"Google Chubby and the Paxos Algorithm" by Philipp Lenssen; Date: Thursday, Jul. 24, 2008; http://blogoscoped.com/archive/2008-07-24-n69.html ; (Last Visited Aug. 13, 2010).
"The Chubby lock service for loosely-coupled distributed systems" by Mike Burrows, Google Inc. ; (Last Visited Aug. 13, 2010).
"Paxos Made Live—An Engineering Perspective" by Tushar Chandra, Robert Griesemer, Joshua Redstone Date: Jun. 26, 2007 ; (Last Visited Aug. 13, 2010).

* cited by examiner

*Primary Examiner* — Michael Maskulinski
(74) *Attorney, Agent, or Firm* — Raj Abhyanker, P.C.; Ramin Mahboubian

(57) ABSTRACT

Several methods and a system of a replicated service for write ahead logs are disclosed. In one embodiment, a method includes persisting a state of a distributed system through a write ahead log (WAL) interface. The method also includes maintaining a set of replicas of a WAL through a consensus protocol. In addition, the method includes providing a set of mechanisms for at least one of detection and a recovery from a hardware failure. The method further includes recovering a persistent state of a set of applications. In addition, the method includes maintaining the persistent state across a set of nodes through the hardware failover. In one embodiment, the system may include a WAL interface to persist a state of a distributed system. The system may also include a WAL replication servlet to maintain and/or recover a set of replicas of a WAL.

53 Claims, 5 Drawing Sheets

| APPLICATION 120 | WAL REPLICATION SERVLET IN PEER NODE 1 106B | WAL REPLICATION SERVLET IN PEER NODE 2 106C | WAL REPLICATION SERVLET IN DESIGNATED NODE 1 106A | ACTIVE MASTER IN DESIGNATED NODE 1 122A | DORMANT MASTER IN DESIGNATED NODE 2 122B | CONSENSUS PROTOCOL 110 |
|---|---|---|---|---|---|---|
| 402 | | | CREATES THE METAWAL | | | |
| 404 | | | IF MULTIPLE SERVLETS HOST METAWAL, CONSENSUS PROTOCOL IS RUN TO DETERMINE ACTIVE WALRUS MASTER | | | |
| 406 | | | | | | RUNS ELECTION TO CHOOSE AN ACTIVE WALRUS MASTER |
| 408 | | | | CHOSEN THROUGH CONSENSUS PROTOCOL | IF NOT CHOSEN THROUGH CONSENSUS PROTOCOL, BECOMES DORMANT MASTER | |
| 410 REQUEST CREATION OF THEIR OWN WALS | | | | | | |
| 412 SPECIFY DESIRED FAULT TOLERANCE IN WAL CREATION | | | | | | |
| 414 COMMUNICATE DIRECTLY TO THE WAL REPLICATION SERVLET IN A PEER NODE | | | | | | |

CRITICAL PATH FLOW 400

MANAGEMENT OF A DISTRIBUTED COMPUTING SYSTEM THROUGH REPLICATION OF WRITE AHEAD LOGS

FIELD OF TECHNOLOGY

This disclosure relates generally to distributed computing systems and, more particularly, to a method, an apparatus and/or a system of persisting a state of the distributed computing system through fault/failure through replication of write ahead logs.

BACKGROUND

Many services in a distributed computing system may need to maintain a persistent state that can be recovered after software and/or hardware fails. One way to maintain this state may be to write it to a disk on the distributed system. While this approach may work in the case of a software failure, it may not work for a hardware failure. When a hardware system crashes, a writes on the disk is also thereby lost. A system of replicating a state of a node is required in case the hardware of the node fails over.

SUMMARY

Disclosed are a method, and/or a system of persisting a state of the distributed system through fault/failure through replication of write ahead logs. In one aspect, the method includes persisting a state of a distributed system through a Write Ahead Log (WAL) interface. The method also includes maintaining a set of replicas of a Write Ahead Log (WAL) through a consensus protocol. In addition, the method includes providing a set of mechanisms for at least one of detection and a recovery from a hardware failure. The method further includes recovering a persistent state of a set of applications. In addition, the method includes maintaining the persistent state across a set of nodes through the hardware failover.

The method may further include running an instance of a WAL replication servlet on a set of nodes. In addition, the method may include storing an on-disk state of an application in the WAL. The method may further include managing a set of WALs through the WAL replication servlet. The method may include authorizing a designated node to host a Master of the WAL replication servlet. The method may further include the Master of the replication servlet, responsible for at least one of a managing of a global state, a managing of a lease and a suggesting of an election. The method may also include storing a metadata in a metaWAL on the designated node. In addition, the method may include self-hosting the metaWAL on the WAL replication servlet of the designated node.

The method may include permitting an application to request an individual WAL to the WAL replication servlet. The method may also include creating a primary replica, through the WAL replication servlet, of the individual WAL. In addition, the method may include specifying, through the application, a desired fault tolerance. The method may further include creating, through a master, a set of secondary replicas based on the desired fault tolerance. The method may include establishing consensus between a set of WAL replication servlets through a consensus protocol. The method may also include establishing consensus for a set of replication operations on the WAL replication servlet through the consensus protocol. In addition, the method may include establishing consensus between a set of client data through the consensus protocol. The method may further include using an optimized version of the consensus protocol to minimize a communication overhead.

The method may include creating a metaWAL to bootstrap a WAL replication servlet. The method may also include designating, as a master, the WAL replication servlet hosting the metaWAL. In addition, the method may include electing, through the consensus protocol, a first master as an active master. The method may further include appointing a second and any other masters as a dormant Master. The method may include registering, through the dormant master, a callback for notification from an elected WAL replication servlet on the designated node when at least one record is chosen in the metaWAL. The method may also include detecting, through the callback for notification, writing and other writings performed by the active Master. In addition, the method may include exclusively authorizing a first primary replica of the WAL to write to the WAL. The method may further include electing, through the consensus protocol, a different primary replica of the WAL when the first primary replica fails.

The method may include suggesting an election, through the active Master, when a lease of a current leader WAL expires. The method may also include permitting the application to create a lease-less WAL. The method may include initializing a replication process. The method may also include hosting a metaWAL on a WAL replication servlet on the designated node. In addition, the method may include initializing the metaWAL. The method may further include evaluating a need for a re-election.

The method may include proposing to the metaWAL, through a dormant Master, an election for a next available consensus protocol when a record is in need of an active lease. The method may also include designating the dormant Master as a new active Master when the election succeeds. The method may also include maintaining, through a Master, a persistent state that includes the host and port of a set of WAL replication servlets. In addition, the method may include maintaining, through the Master, a persistent state of a set of one or more lease information. In addition, the method may include writing the lease information to a metaWAL. The method may further include constructing a remainder of the persistent state with an array of information sent back in a set of heartbeat replies by the set of WAL replication servlets.

The method may include, wherein the set of information consists of at least one of an identification information of the servlet, a state information about a configuration of the WAL, a state information about a last chosen view, a state information of an expiration of a WAL, a state information about a desired extension of a lease, a state information of an activity that occurred at a last selection instance and a last chosen selection instance. The method may also include running an alarm handler to perform a set of management activities. The method may include, wherein the set of management activities includes at least one of a creating a set of a secondary WALs, a deleting a secondary WAL, a proposing of an election, a suggesting of a catch up, and a handling of a lease extension request. The method may include issuing a first set of remote procedure calls (RPC), through the master, to create the set of secondary replicas for a particular WAL when a number of secondary replicas for the particular WAL are below a requisite number.

The method may also include issuing a second set of RPCs to delete one or more of the secondary replicas when the number of the secondary replicas is above the requisite number. In addition, the method may include selecting, through the master, a potential leader for a new WAL when the new WAL does not have a leader. The method may further include proposing an election for the new WAL based on the potential leader. The method may include proposing, through the master, to remove a set of dead replicas. The method may also include proposing to add a set of new replicas. In addition, the method may include inspecting, through the master, to determine if a lag between the WAL of a given WAL replication servlet and another WAL replication servlet that hosts the same WAL is greater than a predetermined value. The method may further include making a catch-up proposal to the given servlet when the lag is greater than the predetermined value.

The method may include granting a lease extension for each WAL utilizing a lease. The method may also include communicating directly, through an application, to a WAL replication servlet when a specific WAL requires hosting. In addition, the method may include specifying a set of configuration parameters for the specific WAL. The method may include wherein the configuration parameters is at least one of a leading WAL name, a desired fault tolerance, a value for whether an WAL uses a lease, a reset value on a node reboot, a reset value on a system restart and a value for whether an initial view is formed. The method may also include maintaining, through a WAL replication servlet, a list of consensus instances. In addition, the method may include running a consensus algorithm at a consensus instance. The method may further include selecting a value from one of a user payload and a view change value for each consensus instance. The method may also include wherein the user payload is a value given to the WAL replication servlet by a user.

The method may include wherein the view change value results when an election proposal is made by at least one of a master and a self-generated election proposal by the WAL. The method may also include initiating the election proposal, through the master, when the master receives heartbeat replies indicating that a leader of a last view has expired. In addition, the method may include specifying, through the master, the consensus instance at which an election occurs. The method may further include initiating the election proposal to a leading WAL replication servlet to add or to remove a set of replicas from a current view. The method may include determining, through the master, a special consensus instance at which a particular election must be run. The method may also include running the consensus algorithm on one or more of a selection instance prior to the special consensus instance containing an unchosen value.

The method may also include failing the particular election when at least one of the consensus algorithm run fails to choose a value. In addition, the method may include determining, through a latest chosen view, a set of replicas that participate in the full consensus algorithm. The method may further include running the particular election at the special selection instance. The method may include running the consensus algorithm on a set of consensus instances beyond the special consensus instance. The method may also include minimizing, through an optimized version of the consensus protocol, a communication overhead.

The method may also include ensuring, through a lease, that a leader of a WAL possesses a set of latest information about content of the WAL. In addition, the method may include configuring the WAL to use the lease. The method may further include granting the lease, through a master, in a set of heartbeat messages. The method may include ensuring, through the master, that an election is not proposed to any other primary replicas of the WAL. The method may also include suggesting a re-election to an existing leader to change a set of current replicas. In addition, the method may include generating the lease and an election-suggestion to a WAL replication servlet when an election is proposed. The method may further include securing a new lease for a new leader when the election is won. The method may include ensuring that a particular lease expires at a remote WAL replication servlet prior to expiring at the Master.

The method may also include recording a servlet time in a corresponding clock in the remote WAL replication servlet. In addition, the method may include communicating the servlet time at the remote WAL replication servlet in a set of heartbeat replies to the master. The method may further include generating the particular lease, through the WAL replication servlet, based on the servlet time and duration of the particular lease. The method may include rejecting a write when a particular WAL replication servlet is not a leader of the WAL. The method may also include running a consensus algorithm to generate a value when the particular WAL replication servlet is the leader of the WAL. In addition, the method may include specifying through a user an instance number at a particular consensus instance for the write. The method may further include requiring a leader WAL replication servlet to use an optimized version of the consensus protocol at the consensus instance of an election.

The method may include accepting a value in a second phase of the consensus protocol. In addition, the method may include broadcasting the value in a third phase of the consensus protocol when the value is accepted by a majority. The method may further include transmitting a reply based on the value to a calling application after the second phase. The method may include generating a proposal number for a run of the consensus protocol consisting of a set of criterias. The method may also include assigning a higher value to a proposal number with higher first criteria than a proposal number with lower first criteria. In addition, the method may include determining the higher value, through the second criteria, when the value for the first criteria is the same. The method may further include determining the higher value, through the third criteria, when the value for the first criteria and the value for the second criteria is the same.

The method may include employing the proposal number of a successful election for a subsequent client write. The method may also include selecting a higher proposal number when a different WAL replication servlet is elected as a leader. In addition, the method may include incrementing the first criteria when a leadership changes. The method may further include incrementing the second criteria when a WAL replication servlet restarts. The method may include obtaining information from a last chosen consensus instance in a heartbeat reply. In addition, the method may include requesting a lagging WAL replication servlet, through a Master, to catch up with a set of other WAL replication servlets. The method may further include sending a catch-up suggestion in a next heartbeat reply to the lagging WAL replication servlet.

The method may include transmitting a request, through the lagging WAL replication servlet, to read a set of chosen values from a remote replica when the catch-up suggestion is received. In addition, the method may include committing the set of chosen values to a local physical WAL. The method may further include applying the set of chosen values to an in-memory state. The method may include creating a set of checkpoints, through the WAL interface. The method may also include issuing a start checkpoint when requested by a user. In addition, the method may include writing a set of checkpoint records when requested by the user. The method may further include issuing a finalize checkpoint when requested by the user. The method may include converting, through a replication WAL Record, the start checkpoint and the finalize checkpoint to a set of special corresponding WAL replication values.

The method may also include rolling a current delta sequence of a WAL replication servlet to a subsequent delta sequence simultaneously at an instance prior to a special corresponding replication value of the start checkpoint. In addition, the method may include attaching a set of information of the current delta sequence pertaining to a set of instances following the special corresponding replication value of the start checkpoint to the subsequent delta sequence. The method may further include discarding information of the current delta sequence simultaneously when a checkpoint at the subsequent delta sequence is created. The method may include wherein the set of information of the prior delta sequence pertaining to a set of instances following the special corresponding replication value is one of a prepared instance, an accepted instance, and a committed instance. The method may also include creating a checkpoint file in a WAL at the subsequent delta sequence when a special corresponding WAL replication value of the finalize checkpoint is generated.

In addition, the method may include initiating a recovery exclusively at the subsequent delta sequence. The method may further include ignoring a set of records in the current delta sequence.

In another aspect, a machine-readable medium providing instructions, which when read by a processor, causes the machine to perform operations that includes generating a set of replicas of a Write Ahead Log (WAL), distributing the set of replicas across a set of nodes, maintaining a persistent state across a set of nodes through a consensus protocol.

The machine-readable medium may include requesting, through an application, a creation of an individual WAL. The machine-readable medium may also include creating a primary replica, through a WAL replication servlet, of the individual WAL. In addition, the machine-readable medium may include specifying, through the application, a desired fault tolerance. The machine-readable medium may further include creating a set of secondary replicas based on the desired fault tolerance. The machine-readable medium may include executing a consensus protocol to establish consensus between a set of WAL replication servlets. The machine-readable medium may also include selecting a leader for the set of WAL replication servlets through the consensus protocol. The machine-readable medium may further include using an optimized version of the consensus protocol to minimize a communication overhead.

The machine-readable medium may include creating a set of checkpoints. The machine-readable medium may also include converting a start checkpoint and a finalize checkpoint to a set of special corresponding WAL replication values. The machine-readable medium may also include rolling a current delta sequence of the WAL replication servlet to a subsequent delta sequence simultaneously at an instance prior to a special corresponding replication value of the start checkpoint. In addition, the machine-readable medium may include attaching a set of information of the current delta sequence pertaining to a set of instances following the special corresponding replication value of the start checkpoint to the subsequent delta sequence. The machine-readable medium may further include discarding information of the current delta sequence simultaneously when a checkpoint at the subsequent delta sequence is created.

In yet another aspect, a system includes a Write Ahead Log (WAL) interface to persist a state of a distributed system. The system also includes a WAL replication servlet to maintain and recover a set of replicas of a Write Ahead Log (WAL). In addition, the system includes a consensus protocol to manage the state of the distributed system through a hardware failure. The system may include a Master of the WAL replication servlet on a designated node to perform at least one of a performing a set of management activities, managing a global state a managing of a lease and a suggesting of an election. The system may also includes wherein the set of management activities includes at least one of a creating a set of a secondary WALs, a deleting a secondary WAL, a proposing of an election, a suggesting of a catch-up, and a handling of a lease extension request. The system may further include an optimized version of the consensus protocol to minimize a communication overhead.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE VIEWS OF DRAWINGS

Example embodiments are illustrated by way of example and not limitation in the figures of accompanying drawings, in which like references indicate similar elements and in which:

FIGS. 4A-4B is a critical path flow diagram illustrating operations involved in dynamic replication of WALs, according to one or more embodiments.

Other features of the present embodiments will be apparent from accompanying Drawings and from the Detailed Description that follows.

DETAILED DESCRIPTION

Example embodiments, as described below, may be used to provide a method, an apparatus, and/or a system of persisting a state of the distributed system through fault/failure through replication of write ahead logs. Although the present embodiments have been described with reference to specific example embodiments, it will be evident that various modifications and changes may be made to these embodiments without departing from the broader spirit and scope of the various embodiments.

Figure 1:
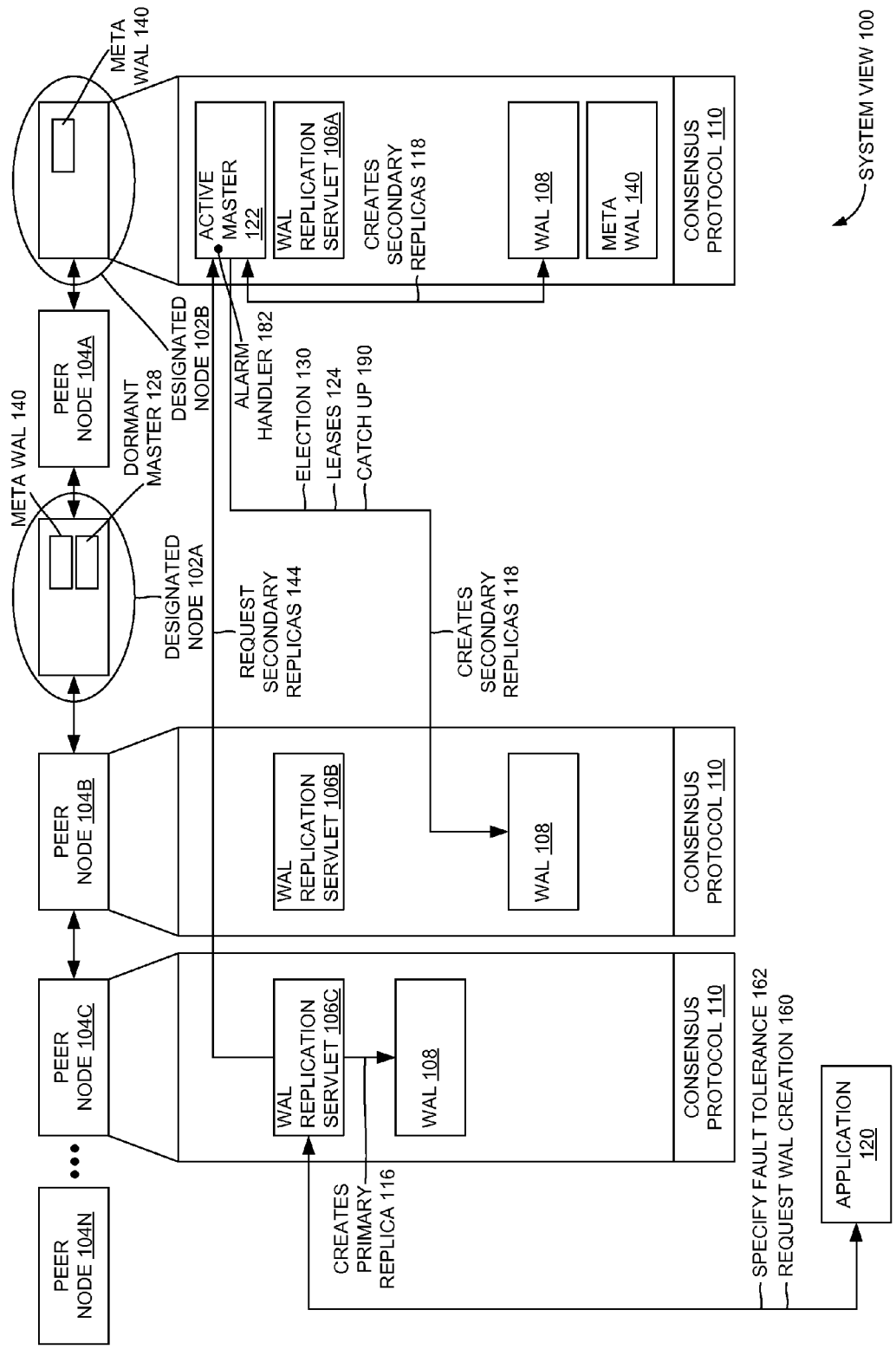
FIG. 1 is a system view illustrating an interaction flow in a system, according to one or more embodiments.

A distributed computing system acting as a server may be configured to serve a large amount of information to a diverse set of nodes, such as a central database for a multi-national corporation, or website. One or more nodes may request information from the distributed computing system acting as a server. By implementing the server functionality across multiple devices, the server as a whole is far less prone to failure due to the increased redundancy. FIG. 1 is a System View 100 illustrating an interaction flow in a system, according to one or more embodiments. The system may include one or more nodes (e.g., peer nodes $104_A$-$104_N$) and one or more designated nodes (e.g., designated node $102_A$, $102_B$) in communication with the nodes through communication network.

The communication network may include a local area network, a wide area network, and the like. Examples of the nodes may include, but is not limited to data processing devices, including hand-held devices, multi-processor systems, microprocessor based or programmable consumer electronics, network PCs, minicomputers, mainframe computers, and the like. Also, FIG. 1 illustrates a distributed computing environment. As will be understood by those skilled in the art, the present invention is applicable to all distributed computing environments and is not intended to be limited in any way by the exemplary distributed computing system of FIG. 1 that has been simplified for presentation purposes.

In one or more embodiments, the nodes may be configured to maintain a write ahead log 108 (WAL) for an application 120 executed on the nodes. As will be known by those skilled in the art, WAL refers to a system of writing modifications into a log, prior to applying the modifications. The purpose of a WAL can be illustrated by an example. Consider, for instance, a program that is in the middle of performing some operation when the node the program is running on loses power. Upon restart, the program might well need to know whether the operation it was performing succeeded, half-succeeded, or failed. On using the WAL, the program could check the log and compare what it was supposed to be doing when it unexpectedly lost power to what was actually done.

In one or more embodiments, one or more WAL replication servlets (e.g., 106A-C) may be installed in each of the nodes in the system to enable replication of the WALs. As used herein, the term "replication" refers to creating one or more copies of the WAL in one or more nodes in the system. The WAL replication servlet 106 installed in each of the nodes may maintain and recover a set of replicas of any given WAL. The WAL replication servlet 106 may enable replication of a given WAL to persist the state of the system, such that whenever a node hosting a given WAL for a given application 120 fails, a replicated WAL in another node may be used to resume execution of the given application 120.

In one or more embodiments, a master 122 of the WAL replication servlet 106 may be installed in a designated node to perform a set of management activities, managing a global state, managing of a lease 124 and/or suggesting of an election 130. The designated node may coordinate between the peer nodes. The set of management activities may include, but is not limited to creating 118 a set of secondary WALs, managing a global state, deleting a secondary WAL, proposing an election 130, suggesting of a catch-up 190, and/or handling of a lease extension request. In one or more embodiments, a consensus protocol 110 may be used to replicate any given WAL for the application 120 in the system.

The distributed computing system referred to herein after as the system, in one or more embodiments may include WAL interface to persist a state of the system. The WAL interface may be operatively coupled to each of the peer nodes in the system. The system further includes the WAL replication servlet 106 installed in each of the peer nodes to maintain and recover a set of replicas of any given WAL. The WAL replication servlet 106 enables replication of a given WAL in one or more peer nodes to persist the state of the system, such that whenever a node hosting a given WAL for a given application 120 fails, a replicated WAL in another node may be used to resume execution of the given application 120.

Each of the peer nodes in the system may run an instance of a WAL replication servlet 106 (WAL replication daemon). Each WAL replication servlet 106 may store an on-disk state in the WAL. One or more applications (e.g., application 120) may request 160 creation of own WALs by communicating directly with the WAL replication servlet. The WAL replication servlet becomes a primary replica for the WAL when the applications communicate with the WAL replication servlet to create the WAL for the application 120. A set of replicas of the WAL may be maintained in the system through the consensus protocol 110 (e.g., Paxos protocol).

In one or more embodiments a set of mechanisms may be provided for one or more of detection and/or recovery from a hardware failure. In one or more embodiments, a persistent state of a set of applications may be recovered and the persistent state may be maintained across the set of nodes through the hardware failover. In order to maintain the persistent state, an instance of the WAL replication servlet 106 installed in each of the nodes may be run. An on-disk state of an application 120 may be stored in the WAL. A set of WALs may be managed through the WAL replication servlet 106. In one or more embodiments, a metadata (e.g., list of all peer nodes in the system) for the WAL replication servlet may be stored in a metaWAL 140 on the designated node. The metaWAL 140 may be self-hosted on the WAL replication servlet 106 of the designated node and may be created to bootstrap the WAL replication servlet 106.

In one or more embodiments, the application 120 may be permitted to request 160 an individual WAL to the WAL replication servlet 106. A primary replica may be created, through the WAL replication servlet 106, of the individual WAL. A desired fault tolerance may be specified 162, through the application 120 and a set of secondary replicas may be created 118 through a master based on the desired fault tolerance. At any given time, only one of the nodes may be allowed to perform a write operation on the WAL/the replicated WALs. In one or more embodiments, a consensus may be established between a set of WAL replication servlets 106A-C through a consensus protocol 110. The consensus may also be established for a set of replication operations on the WAL replication servlet 106, between a set of client data through the consensus protocol 110.

In one or more embodiments, an optimized version of the consensus protocol 110 may be employed to minimize a communication overhead. In a consensus algorithm of the consensus protocol 110, as will be described further below, any of the nodes can act as a leader and transmit a suggestion for a proposal number to other devices within the distributed computing system. The other nodes can respond with either an indication of the proposal having the largest proposal number for which that node has already voted or an indication that the node has not voted for any previous proposals. Once the leader receives the responses from the other nodes, it can determine one or more functions to propose and request a vote for a proposed function. Each node may vote for the proposal unless the node has, at some time prior to the requested vote, responded to a suggestion for a higher proposal number. If a quorum of nodes votes for the proposal, then the proposal may be accepted, and the leader can transmit a message to all of the nodes requesting that they execute the agreed upon function.

The consensus algorithm requires a large number of nodes to tolerate failures. Specifically, to tolerate F number of failures, the consensus algorithm requires a distributed computing system comprising at least 2F+1 number of nodes (e.g., computing devices). Of the available nodes, only a simple majority may be needed to select commands and to continue proper operation of the system. The remaining nodes can remain unused until one of the nodes selecting commands and operating the system fails. If a node permanently fails, it is desirable to remove it from the set of 2 F+1 nodes, and to replace it with a new node, in order that the consensus algorithm will be able to tolerate F additional failures.

In one or more embodiments, a first master may be elected from among the nodes as an active master 122 through the consensus protocol 110. In one or more embodiments, a second, and/or any other masters may be appointed as a dormant master. A callback for a notification from an elected WAL replication servlet 106 on the designated node may be registered through the dormant Master, and a callback for at least one record may be chosen in the metaWAL 140. In one or more embodiments, a writing performed by the active master 122 may be determined through the callback for notification. In one or more embodiments, a first primary replica of the WAL to write to the WAL may be exclusively authored.

In one or more embodiments, a different primary replica of the WAL when the first primary replica fails may be elected through the consensus protocol 110. The election may be suggested through the active master 122, when a lease of a current leader WAL expires. In one or more embodiments, the application 120 may be permitted to create a lease-less WAL. In one or more embodiments, a replication process may be initialized. A metaWAL 140 may be hosted on a WAL replication servlet 106 on the designated node. The metaWAL 140 may then be initialized and a need for a re-election may be evaluated.

In one or more embodiments, an election for a next available consensus protocol 110 may be proposed to the metaWAL 140, through a dormant master 128 when a chosen record is in need of an active lease. In one or more embodiments, the dormant master 128 may be designated as a new active master 122 when the election succeeds. A persistent state of a host port for a set of WAL replication servlet 106s and/or a persistent state of a set of one or more lease information; may be maintained through the master. In one or more embodiments, the lease information may be written to the metaWAL 140.

In one or more embodiments, a remainder of the persistent state may be constructed with an array of information sent back in a set of heartbeat replies by the set of WAL replication servlets. The array of information may include, but is not limited to one or more of a servlet identification information, a state information about a configuration of the WAL, a state information about a last chosen view, a state information of an expiration of a WAL, a state information about a desired extension of a lease, a state information of an activity that occurred at a last selection instance and a last chosen selection instance.

In one or more embodiments, an alarm handler may be run to perform a set of management activities. The set of management activities may include, but is not limited to, one or more of a creating a set of secondary WALs, deleting a secondary WAL, proposing of an election, suggesting of a catch-up, and/or handling of a lease extension 124 request. In one or more embodiments, a first set of remote procedure calls (RPC) may be issued, through the master, to create the set of secondary replicas 118 for a particular WAL when a number of secondary replicas for the particular WAL are below a requisite number. A second set of RPCs may be issued to delete one or more of the secondary replicas when the number of the secondary replicas is above the requisite number. In one or more embodiments, a potential leader for a new WAL may be selected through the master when the new WAL does not have a leader.

An election may be proposed for the new WAL based on the potential leader. In one or more embodiments, removal of a set of dead replicas and addition of a set of new replicas may be proposed through the master of the WAL replication servlet. In one or more embodiments, it may be inspected, through the Master, to determine if a lag between the WAL of a given WAL replication servlet 106 and another WAL replication servlet that hosts the same WAL is greater than a predetermined value. In one or more embodiments, a catch-up proposal may be made to the given WAL replication servlet 106 when the lag is greater than the predetermined value.

A lease extension 124 may be granted for each WAL utilizing a lease. When a specific WAL requires hosting, a WAL replication servlet 106 may be directly communicated through an application 120. Also, a set of configuration parameters may be specified for the specific WAL. The configuration parameters may include, but is not limited to, one or more of a leading WAL name, a desired fault tolerance, a value for whether a WAL uses a lease, a reset value on a node reboot, a reset value on a system restart and/or a value for whether an initial view is formed. In accordance with the method and system disclosed herein, the distributed system can implement a fault tolerant algorithm while allowing nodes to be added and removed from the system.

Figure 2:
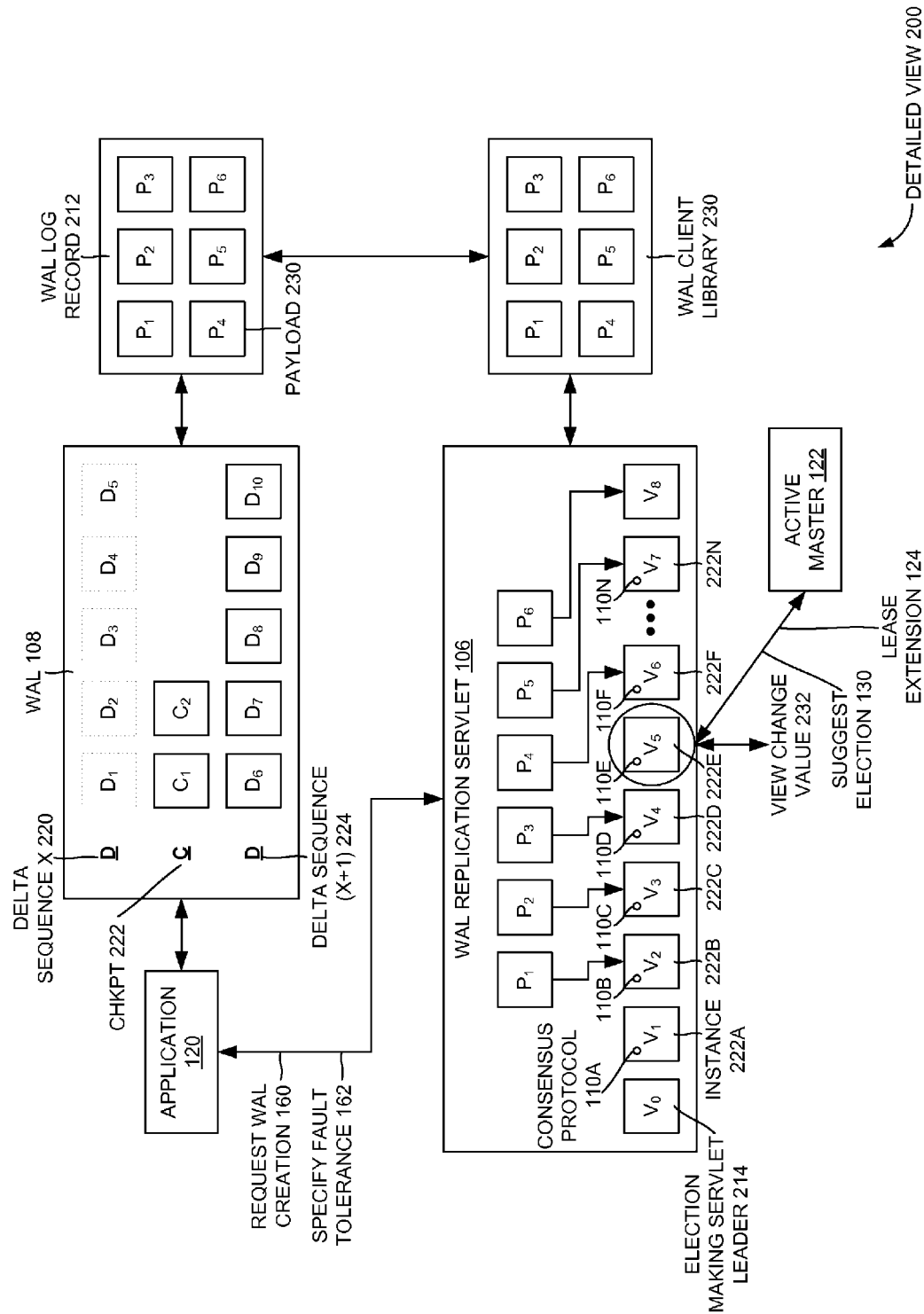
FIG. 2 is a detailed view illustrating an architecture flow in the system, according to one or more embodiments.

FIG. 2 is a Detailed View 200 illustrating an architecture flow in the system, according to one or more embodiments. In one or more embodiments, a list of consensus instances (e.g., consensus instances $222_A$-$222_N$) may be maintained through a WAL replication servlet 106. A consensus algorithm may be run at a consensus instance. A value may be selected from a user payload 230 and/or a view change value 232 for each consensus instance 222. The user payload 230 may be a value given to the WAL replication servlet by a user. A view change value 232 may result when an election proposal is made by the master and/or a self-generated election proposal by the WAL.

In one or more embodiments, the election proposal may be initiated through the Master, when the Master receives heartbeat replies indicating that a leader of a last view has expired. The consensus instance 222 at which an election occurs may be specified through the master. The election proposal may be initiated to a leading WAL replication servlet 106 to add or to remove a set of replicas from a current view. A special consensus instance at which a particular election must be run may be initiated through the master. The consensus algorithm may be run on one or more of a selection instance prior to the special consensus instance containing an unchosen value. The particular election when at least one of the consensus algorithm run fails to choose a value may be failed. A set of replicas that participate in the full consensus algorithm may be determined, through a latest chosen view. The particular election may be run at the special consensus instance.

The consensus algorithm may be run on the set of consensus instances beyond the special consensus instance. A first phase of the consensus algorithm for the set of consensus instances beyond the special consensus instance may be skipped through an optimized version of the consensus protocol 110. Further, a second phase of the selection algorithm for the set of selection instances beyond the special consensus instance may be directly proceeded to. In one or more embodiments, it may be ensured, through a lease, that a leader of a WAL possesses a set of latest information about content of the WAL. The WAL may be configured to use the lease. The lease may be granted through a Master, in a set of heartbeat messages.

In one or more embodiments, it may be ensured, through the Master, that an election is not proposed to any other primary replicas of the WAL. A re-election may be suggested to an existing leader to change a set of current replicas. The lease and an election-suggestion may be generated to a WAL replication servlet 106 when an election is proposed. A new lease may be secured for a new leader when the election is won. In one or more embodiments, it may be ensured that a particular lease expires at a remote WAL replication servlet 106 prior to expiring at the master. A servlet time may be recorded in a corresponding clock in the remote WAL replication servlet 106. The servlet time at the remote WAL replication servlet 106 may be communicated in a set of heartbeat replies to the master. The particular lease may be generated through the WAL replication servlet, based on the servlet time and duration of the particular lease.

In one or more embodiments, a write may be rejected when a particular WAL replication servlet 106 is not a leader of the WAL. A consensus algorithm may be run to generate a value when the particular WAL replication servlet 106 is the leader of the WAL. An instance number may be specified through a user at a particular consensus instance for the write. For instance, once an election processing begins, the WAL replication servlet 106 figures out the consensus instance 222 at which this election is to be run. The consensus instance 222 is either explicitly provided by the WAL replication servlet 106, the active master or it may be chosen to be the next one available. The WAL replication servlet 106 then starts running the consensus algorithm at each consensus instance 222 before the one that has unchosen values.

If the latest consensus at which a value P is chosen, and the election is to be done at the instance P+E, then the full consensus algorithm shall be run serially at the instances P+1, P+2, . . . , P+E (e.g., $P_1, P_2, P_3, P_4, P_5,$ and $P_6$ as illustrated in FIG. 2) to get values chosen (e.g., $V_2, V_3, V_4, V_6, V_7,$ and $V_8$). If any of the consensus run fails to choose a value, then the election is failed. At each consensus instance 222, the set of replicas that participate in the consensus algorithm is determined by the latest chosen view known at that point. The view configuration information is part of the state of the WAL maintained by the consensus algorithm. Finally, consensus may also run at the election consensus instance P+E. The Prepare phase of the consensus algorithm in this case uses multi-consensus, meaning that is, it is not only done for instance P+E, it is also done for all the consensus instances beyond P+E.

Thus, if the election succeeds, subsequent writes made at consensus instances P+E+1, P+E+2, and so on can skip the prepare phase and directly go to the second round of consensus. In one or more embodiments, a set of checkpoints (e.g., check points $C_1, C_2$) may be created through the WAL interface. A start checkpoint command (startCkpt( )) may be issued when requested by a user. A set of checkpoint records may be written when requested by the user. A finalize checkpoint (finalizeCkpt( )) command may be issued when requested by the user. The start checkpoint and/or the finalize checkpoint may be converted to a set of special corresponding WAL replication values through a replication WAL Record. In one or more embodiments, a current delta sequence 220 (e.g., $D_1, D_2, D_3, D_4,$ and $D_5$). of a WAL replication servlet 106 may be rolled to a subsequent delta sequence 224 (e.g., $D_6, D_7, D_8, D_9,$ and $D_{10}$) simultaneously at an instance prior to a special corresponding replication value of the start checkpoint.

A set of information of the current delta sequence 220 pertaining to a set of instances following the special corresponding replication value of the start checkpoint to the subsequent delta sequence 224 may be attached. The information of the current delta sequence 220 (e.g., $D_1, D_2, D_3, D_4,$ and $D_5$) may be discarded simultaneously when a checkpoint at the subsequent delta sequence is created. The set of information of the prior delta sequence pertaining to a set of instances following the special corresponding replication value may be a prepared instance, an accepted instance, and/or a committed instance. At any given point, there can be one active checkpoint in the system. Further, all delta sequences before the active checkpoint are no longer used/required by the system.

In one or more embodiments, a checkpoint file may be created in a WAL at the subsequent delta sequence 224 when a special corresponding WAL replication value of the finalize checkpoint (e.g., checkpoint $C_1$) is generated. A recovery may be initiated exclusively at the subsequent delta sequence 224. A set of records may be ignored in the current delta sequence 220, meaning that if the WAL replication servlet 106 is currently writing to delta sequence X 220, the WAL replication servlet 106 may now start writing to delta t X+1 224. Once the finalizeCkpt( ) value is chosen, a checkpoint at the delta sequence X+1 224 would be created, thus discarding all the earlier information in the delta sequence X 220 and earlier.

Any information in the delta sequence X 220 that pertains to instances after the one corresponding to startCkpt( ) is also added again to the delta file at the delta sequence X+1 224, and goes to the next checkpoint so that applications are not blocked. When the finalizeCkpt( ) value gets chosen, the WAL replication servlet 106 creates a 0 byte checkpoint file in the primary WAL at the delta sequence X+1 224, following which, any recovery will only start at the delta sequence X+1 224 and any record in delta file X and earlier are ignored.

Figure 3:
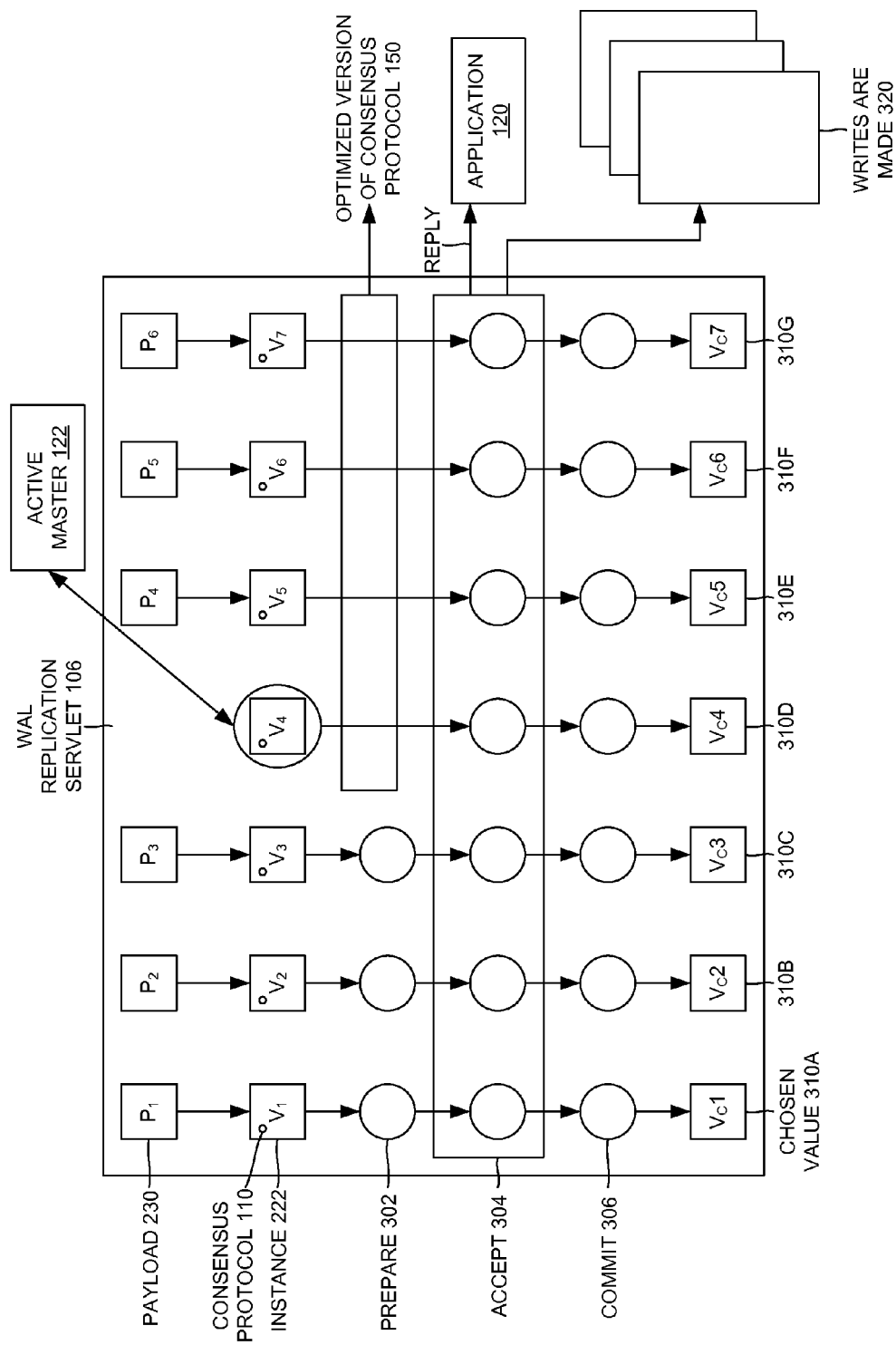
FIG. 3 is a schematic view illustrating operation of an optimized version of the consensus protocol for replication of a write ahead log (WAL), according to one or more embodiments.

FIG. 3 is a schematic view illustrating operation of an optimized version of the consensus protocol 150 for replication of WALs, in accordance with one or more embodiments. In one or more embodiments, a leader WAL replication servlet 106 is required to use the optimized version of the consensus protocol 150 at the consensus instance 222 of an election. In a first stage 302, the consensus instance 222 may be prepared. A value from among multiple values (e.g., $V_1$-$V_7$) of the consensus instance 222 of the optimized version of the consensus protocol 150 may be accepted in a second phase 302 of the optimized version of the consensus protocol 150. The values (e.g., $V_1$-$V_7$) may correspond to various payloads (e.g., $P_1$-$P_6$) as illustrated in FIG. 3. The value may be broadcasted in a third phase 306 of the optimized version of the consensus protocol 150 when the value is accepted by a majority.

A reply may be transmitted based on the value to a calling application after the second phase 304. A proposal number may be generated for a run of the optimized version of the consensus protocol 150 consisting of a many criterias. In the case of a Paxos protocol, there may be a first criteria, second criteria and third criteria. A higher value may be assigned to a proposal number with higher first criteria than the proposal number with a lower first criteria. The higher value may be determined through the second criteria, when the value for the first criteria is the same. The higher value may be determined through the third criteria, when the value for the first criteria and the value for the second criteria is the same. The proposal number of a successful election may be employed for a subsequent write operation 320. A higher proposal number may be selected when a different WAL replication servlet 106 is elected as a leader.

The first criteria may be incremented when a leadership changes. The second criteria may be incremented when a WAL replication servlet 106 restarts. An information may be obtained from a last chosen consensus instance in a heartbeat reply. A lagging WAL replication servlet 106 may be requested through a Master, to catch up with a set of other WAL replication servlets. A catch-up suggestion may be sent in a next heartbeat reply to the lagging WAL replication servlet. In one or more embodiments, a request may be transmitted, through the lagging WAL replication servlet, to read a chosen value 310A from a remote replica when the catch-up suggestion is received. Also, at the third stage 306, a set of chosen values (e.g., $VC_1$-$VC_7$) may be committed to a local physical WAL. The chosen values 310A-G may be applied to an in-memory state.

Also disclosed herein is a machine-readable medium providing instructions, which when read by a processor cause the machines to perform operations including generating a set of replicas of a Write Ahead Log(WAL), distributing the set of replicas across a set of nodes and maintaining a persistent state across a set of nodes through a consensus protocol. The machine-readable medium may include, but is not limited to, a memory, a transportable medium such as a CD, a DVD, a Blu-ray™ disc, a floppy disk, or a diskette. By way of example, and not limitation, the machine readable medium may include computer storage media and/or communication media.

The computer storage media may include, but is not limited to, volatile and/or nonvolatile, removable and/or non-removable media implemented in any method or technology for storage of information such as computer readable instructions, data structures, program modules or other data. The computer storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and can be accessed by a machine (e.g., a computing device).

The communication media typically embodies computer readable instructions, data structures, program modules or other data in a modulated data signal such as a carrier wave or other transport mechanism and includes any information delivery media. The operations may also include requesting through an application, a creation of an individual WAL, creating a primary replica, through a WAL replication servlet, of the individual WAL, specifying, through the application, a desired fault tolerance, creating a set of secondary replicas based on the desired fault tolerance, executing a consensus protocol to establish consensus between a set of WAL replication servlets, selecting a leader for the set of WAL replication servlets through the consensus protocol, and using an optimized version of the consensus protocol to minimize a communication overhead.

In one or more embodiments, the operation may further include creating a set of checkpoints, converting a start checkpoint and a finalize checkpoint to a set of special corresponding WAL replication values, rolling a current delta sequence of the WAL replication servlet 106 to a subsequent delta sequence simultaneously at an instance prior to a special corresponding replication value of the start checkpoint, attaching a set of information of the current delta sequence pertaining to a set of instances following the special corresponding replication value of the start checkpoint to the subsequent delta sequence, and discarding an information of the current delta sequence simultaneously when a checkpoint at the subsequent delta sequence is created.

Figure 4B:
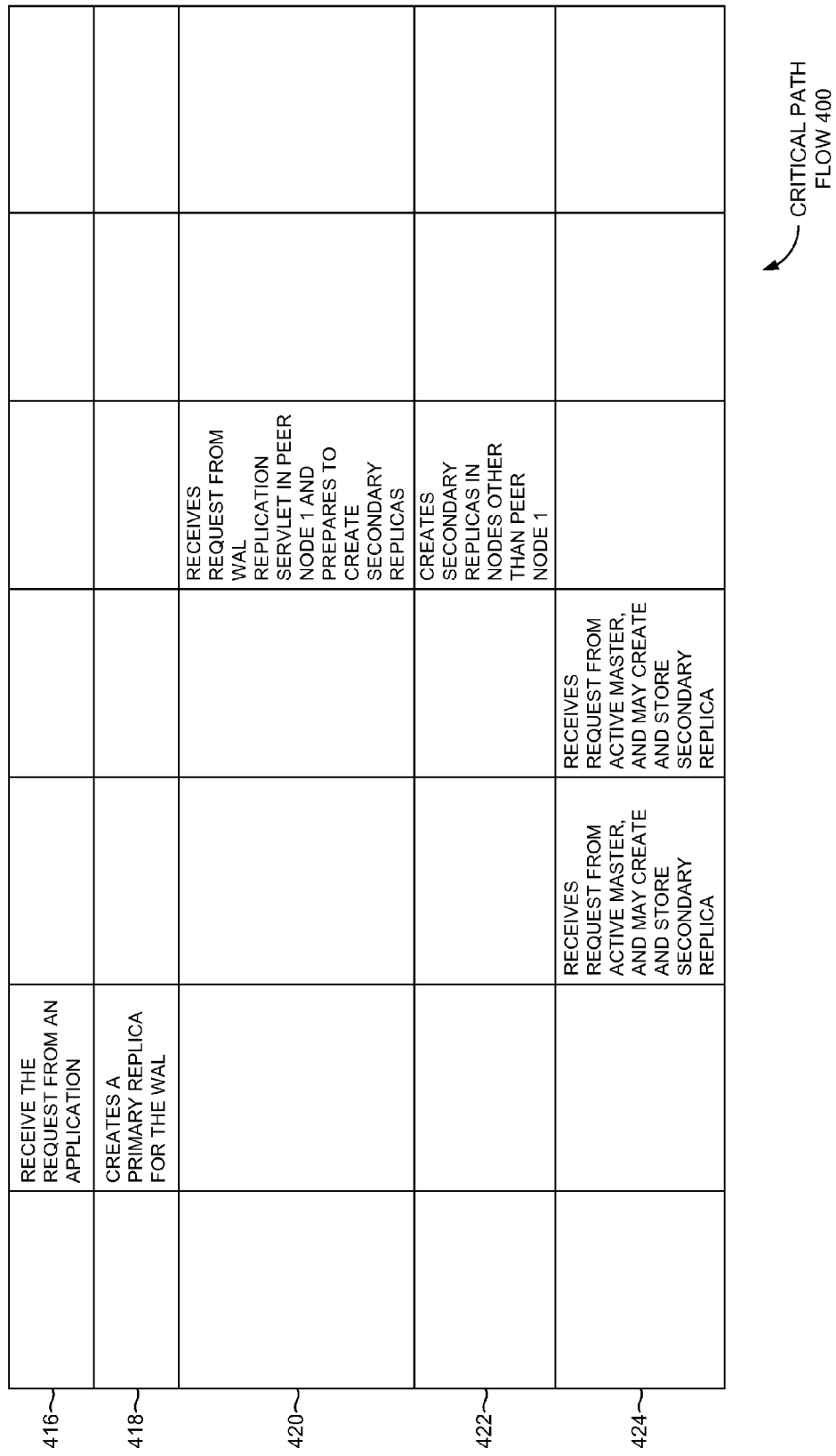

FIGS. 4A-4B is a critical path flow diagram illustrating operations of dynamic replication of WALs, according to one or more embodiments. In operation 402, a WAL replication servlet in a designated node 1 106A creates a metaWAL 140. In operation 404, if multiple servlets host metaWAL 140, a consensus protocol 110 is run at the designated node 1 106A to determine an active master 122. In operation 406, the consensus protocol 110 runs an election to choose the active master 122. In operation 408, an active master 122A in designated node 1 may be chosen through the consensus protocol 110. The WAL replication servlet in designated node 2 becomes a dormant master 122B when it is not chosen through the consensus protocol. In operation 410, an application 120 may request creation of a WAL for the application 120. In operation 412, the application 120 may specify fault tolerance in WAL creation.

In operation 414, the application 120 may communicate directly to the WAL replication servlet in a peer node. In operation 416, the WAL replication servlet in peer node 1 106B may receive the request from the application 120. In operation 418, the WAL replication servlet in peer node 1 106B may create a primary replica for the WAL. In operation 420, the active master in the designated node 122A may receive the request from the WAL replication servlet in peer node 1 and may prepare to create secondary replicas. In operation 422, the active master in the designated node 122A creates secondary replicas in nodes other than peer node 1. In operation 424, the WAL replication servlet in peer node 2 106C receives the request from the active master 122 A and may create and store secondary replica. Also, the WAL replication servlet in designated node 1 106A receives the request from the active master 122A and may create and store the secondary replica.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method comprising:
   replicating a Write Ahead Log (WAL) hosted on a node of a distributed computing system on at least another node of the distributed computing system, the WAL including at least one application state of at least one application executing on the node of the distributed computing system, wherein replicating the WAL includes: running an instance of a WAL replication servlet on each of the node and the another node; and
   storing, in the WAL, an on-disk state of the application through the WAL replication servlet;
   designating one of the node and the another node to host a master of the WAL replication servlet to coordinate between peer nodes of the distributed computing system;
   coordinating between the node and the at least one other node of the distributed computing system to manage the at least one application state as global state of the distributed computing system, wherein the coordinating between peer nodes includes at least one of managing a global state of the distributed computing system, managing a lease and suggesting an election through the master of the WAL replication servlet; and
   resuming execution of the application on the distributed computing system upon a failure of the node hosting the WAL through the replicated WAL on the at least another node to persist at least the application state of the at least one application on the distributed computing system.

2. The method of claim 1, further comprising:
   storing metadata including a list of the peer nodes in a metaWAL on the designated one of the node and the another node; and
   self-hosting the metaWAL on the WAL replication servlet of the designated one of the node and the another node.

3. The method of claim 2, further comprising at least one of:

establishing consensus between the WAL replication servlet on the node and the WAL replication servlet on the another node through a consensus protocol;
establishing consensus for a replication operation on the WAL replication servlet of at least one of the node and the another node through the consensus protocol;
establishing consensus between a set of data associated with client devices of the distributed computing system through the consensus protocol; and
optimizing the consensus protocol to minimize a communication overhead.

4. The method of claim 3, further comprising at least one of:
creating the metaWAL to bootstrap the WAL replication servlet; and
electing, through the consensus protocol, the master as an active master.

5. The method of claim 4, further comprising appointing at least one of the another node and yet another node of the distributed computing system as a dormant master.

6. The method of claim 5, further comprising:
registering, through the dormant master, a callback for notification from an elected WAL replication servlet on the designated one of the node and the another node when at least one record is chosen in the metaWAL; and
detecting, through the callback for notification, a writing performed by the active master.

7. The method of claim 6, further comprising:
exclusively authorizing a first primary replica of the WAL to write to the WAL; and
electing, through the consensus protocol, a different primary replica of the WAL upon a failure of the first primary replica.

8. The method of claim 6, further comprising:
proposing an election for a next available consensus protocol to the metaWAL through the dormant master when the chosen at least one record is in need of an active lease; and
designating the dormant master as a Previously Presented active master when the election succeeds.

9. The method of claim 6, further comprising:
creating a checkpoint through an interface associated with the WAL;
issuing a start checkpoint when requested;
writing a checkpoint record when requested; and
issuing a finalize checkpoint when requested.

10. The method of claim 9, further comprising:
converting, through a replication WAI, record, the start checkpoint and the finalize checkpoint to a special corresponding WAL replication value;
rolling a current delta sequence of the WAL replication servlet to a subsequent delta sequence simultaneously at an instance prior to the special corresponding WAL replication value of the start checkpoint;
attaching, to the subsequent delta sequence, information associated with the current delta sequence pertaining to an instance following the special corresponding WAL replication value of the start checkpoint; and
discarding information of the current delta sequence simultaneously when a checkpoint at the subsequent delta sequence is created.

11. The method of claim 10, wherein the information pertaining to the instance following the special corresponding WAL replication value is one of a prepared instance, an accepted instance and a committed instance.

12. The method of claim 10, further comprising:
creating a checkpoint file in the WAL at the subsequent delta sequence when the special corresponding WAL replication value of the finalize checkpoint is generated;
initiating a recovery exclusively at the subsequent delta sequence; and
ignoring a record in the current delta sequence.

13. The method of claim 4, further comprising:
suggesting an election, through the active master, when a lease of a current leader WAL expires; and
permitting the application to create a lease-less WAL.

14. The method of claim 13, further comprising:
initializing a replication process of the WAL;
initializing the metaWAL on the WAL replication servlet on the designated one of the node and the another node; and
evaluating a need for a re-election.

15. The method of claim 3, further comprising:
maintaining, through the master, a persistent state of a host port for the WAL replication servlets.

16. The method of claim 15, further comprising:
maintaining, through the master, a persistent state of lease information; and
writing the lease information to the metaWAL.

17. The method of claim 16, further comprising:
constructing a remainder of the persistent state with an array of information transmitted in a set of heartbeat replies by the WAL replication servlets.

18. The method of claim 17, wherein the array of information includes at least one of a servlet identification information, a state information about a configuration of the WAL, a state information about a last chosen view, a state information of an expiration of a WAL, a state information about a desired extension of a lease, a state information of an activity that occurred at a last selection instance and a last chosen selection instance.

19. The method of claim 18, further comprising:
executing an alarm handler to perform a management activity.

20. The method of claim 19, wherein the management activity includes at least one of creating a secondary replica WAL for the WAL, deleting the secondary replica WAL for the WAL, proposing an election, suggesting a catch-up and handling a lease extension request.

21. The method of claim 20, further comprising:
issuing a Remote Procedure Call (RPC) through the master to create the secondary replica WAI, for the WAI, when a number of secondary replica WAI,s for the WAL is below a requisite number; and
issuing another RPC to delete at least one secondary replica WAL when the number of secondary replica WALs is above the requisite number.

22. The method of claim 21, further comprising:
selecting, through the master, a potential leader for the WAL when the WAL does not have a leader; and
proposing an election for the WAL based on the potential leader.

23. The method of claim 22, further comprising:
proposing, through the master, removal of a dead replica WAL; and
proposing, through the master, addition of a Previously Presented replica WAL.

24. The method of claim 23, further comprising:
determining, through the master, if a lag between the WAL of a WAL replication servlet and another WAL replication servlet hosting the same WAL is greater than a predetermined value thereof; and proposing catch-up to the WAL replication servlet when the lag is greater than the predetermined value.

25. The method of claim 24, further comprising:
granting extension of a lease for the WAI, when the WAI, is utilizing the lease.

26. The method of claim 3, further comprising:
maintaining, through the WAL replication servlet, a list of consensus instances;
running a consensus algorithm at a consensus instance; and
selecting a value from one of a user payload and a view change value for the consensus instance.

27. The method of claim 26, wherein the user payload is a value given to the WAL replication servlet by a user of the distributed computing system.

28. The method of claim 26, wherein the view change value results when an election proposal is made by at least one of the master and a self-generated election proposal by the WAL.

29. The method of claim 28, further comprising:
initiating the election proposal through the master when the master receives a heartbeat reply indicating that a leader of a last view has expired; and
specifying through the master the consensus instance at which an election associated with the election proposal occurs.

30. The method of claim 29, further comprising:
initiating a leading WAL replication servlet to one of: add and remove a replica from a current view.

31. The method of claim 30, further comprising:
determining, through the master, a special consensus instance at which a particular election must be run.

32. The method of claim 31, further comprising:
running the consensus algorithm on at least one selection instance prior to the special consensus instance including an unchosen value;
failing the particular election when the consensus algorithm run fails to choose a value;
determining, through a latest chosen view, a replica that participates in the consensus algorithm; and
running the particular election at the special selection instance.

33. The method of claim 32, further comprising:
executing the consensus algorithm on a consensus instance beyond the special consensus instance; and
minimizing, through an optimized version of the consensus protocol, the communication overhead.

34. The method of claim 26, further comprising:
rejecting a write when a particular WAL replication servlet is not a leader of the WAL; and
running the consensus algorithm to generate a value when the particular WAL replication servlet is the leader of the WAL.

35. The method of claim 34, further comprising specifying an instance number at a particular consensus instance associated with the write.

36. The method of claim 35, further comprising requiring the leader WAL replication servlet to use an optimized version of the consensus protocol at the consensus instance of the election.

37. The method of claim 35, further comprising:
accepting a value in a second phase of the consensus protocol;
broadcasting the value in a third phase of the consensus protocol when the value is accepted by a majority; and
transmitting a reply based on the value to the application after the second phase.

38. The method of claim 37, further comprising:
generating a proposal number for a run of the consensus protocol including a set of criteria;
assigning a higher value to a proposal number with a higher first criterion than a proposal number with a lower first criterion;
determining the higher value through the second criterion when the value for the first criterion is the same; and
determining the higher value through a third criterion when the value for the first criterion and the value for the second criterion is the same.

39. The method of claim 38, further comprising:
employing the proposal number of a successful election for a subsequent client write;
selecting a higher proposal number when a different WAL replication servlet is elected as the leader;
implementing the first criterion when the leadership changes; and
implementing the second criterion when the WAL replication servlet restarts.

40. The method of claim 35, further comprising:
obtaining information from a last chosen consensus instance in a heartbeat reply;
requesting, through the master, a lagging WAL replication servlet to catch up with at least one other WAL replication servlet; and
sending a suggestion for the catch-up in a succeeding heartbeat reply to the lagging WAL replication servlet.

41. The method of claim 40, further comprising:
transmitting, through the lagging WAL replication servlet, a request to read a chosen value from a remote replica WAL upon receipt of the catch-up suggestion;
committing the chosen value to a local physical WAL; and
applying the chosen value to an in-memory state thereof.

42. The method of claim 3, further comprising:
ensuring, through a lease, that a leader of the WAL possesses latest information about a content thereof;
configuring the WAL to use the lease; and
granting the lease through the master in a set of heartbeat messages.

43. The method of claim 42, further comprising:
ensuring, through the master, that an election is not proposed to another primary replica of the WAL; and
suggesting a re-election to an existing leader to change a current replica of the WAL.

44. The method of claim 43, further comprising:
generating the lease and an election suggestion to the WAL replication servlet when the election is proposed; and
securing a Previously Presented lease for a Previously Presented leader when the election succeeds.

45. The method of claim 44, further comprising:
ensuring that the lease expires at a remote WAL replication servlet prior to expiring at the master;
recording a servlet time in the remote WAL replication servlet;
communicating the servlet time at the remote WAL replication servlet in a heartbeat reply to the master; and
generating the lease based on the servlet time and a duration thereof through the WAL replication servlet.

46. The method of claim 1, further comprising:
permitting the application to request the WAL to the WAL replication servlet;
creating, through the WAL replication servlet, a primary replica of the WAL; and
creating, through the master of the WAL replication servlet, at least one secondary replica based on a desired fault tolerance of the distributed computing system.

47. The method of claim 1, further comprising: communicating directly, through the application, to the WAL replication servlet
when a specific WAL requires hosting; and
specifying configuration parameters for the specific WAL.

48. The method of claim 47, wherein the configuration parameters include at least one of a leading WAL name, a desired fault tolerance, a value associated with utilization of a lease by the specific WAL, a reset value on a reboot of a node of the distributed computing system configured to host the specific WAL, a reset value of a system restart and a value for whether an initial view is formed.

49. A non-transient computer readable medium storing in a tangible form at least computer executable instructions for, the computer executable instructions comprising:
 instructions associated with replicating a WAL hosted on a node of the distributed computing system on at least one another node the distributed computing system, the WAL including at least one state of at least one application executing on the distributed computing system; and
 instructions associated with requesting, through the application, creation of the WAL;
 instructions associated with creating a primary replica of the WAL through a WAL replication servlet;
 instructions associated with specifying, through the application, a desired fault tolerance; and
 instructions associated with creating a secondary replica based on the desired fault tolerance;
 instructions associated with resuming execution of the application on the distributed computing system upon a failure of the node hosting the WAL through the replicated WAL on the at least another node to persist at least the state of the at least one application on the distributed computing system.

50. The non-transient computer readable medium of claim 49, further comprising:
 instructions associated with executing a consensus protocol to establish consensus between the WAL replication servlet and another WAL replication servlet;
 instructions associated with selecting a leader for the WAL, replication servlets through the consensus protocol; and
 instructions associated with optimizing the consensus protocol to minimize a communication overhead.

51. The non-transient computer readable medium of claim 50, further comprising:
 instructions associated with creating a checkpoint;
 instructions associated with converting a starting checkpoint and a finalize checkpoint to an special corresponding WAL replication value;
 instructions associated with rolling a current delta sequence of the WAL replication servlet to a subsequent delta sequence simultaneously at an instance prior to the special corresponding WAL replication value of the starting checkpoint;
 instructions associated with attaching, to the subsequent delta sequence, information of the current delta sequence pertaining to an instance following the special corresponding WAL replication value of the start checkpoint; and
 instructions associated with discarding information of the current delta sequence simultaneously when a checkpoint at the subsequent delta sequence is created.

52. A distributed computing system comprising:
a plurality of nodes, wherein each one of the nodes includes one or more processors rendering the distributed computing system operable to:
 replicate a Write Ahead Log (WAL) hosted on a node of a distributed computing system on at least another node of the distributed computing system, the WAL including at least one state of at least one application executing on the distributed computing system; and
 resume execution of the application on the distributed computing system upon a failure of the node hosting the WAL through the replicated WAL on the at least another node to persist at least the state of the at least one application on the distributed computing system,
wherein an instance of a WAL replication servlet is configured to execute on the node and the another node,
wherein a replica of the WAL is configured to be created through one of the instance of the WAL replication servlet executing on the node and the instance of the WAL replication servlet executing on the another node, and
wherein a master of the WAL replication servlets is chosen on the one of the node and the another node to perform a management activity associated with the distributed computing system, and wherein the management activity includes at least one of creating a secondary WAL, deleting the secondary WAL, proposing an election, suggesting a catch-up and handling a lease extension request.

53. The distributed computing system of claim 52, the distributed computing system operable to: optimize a consensus protocol for communication associated with WAL replication to minimize a communication overhead.

* * * * *